Patented May 27, 1952

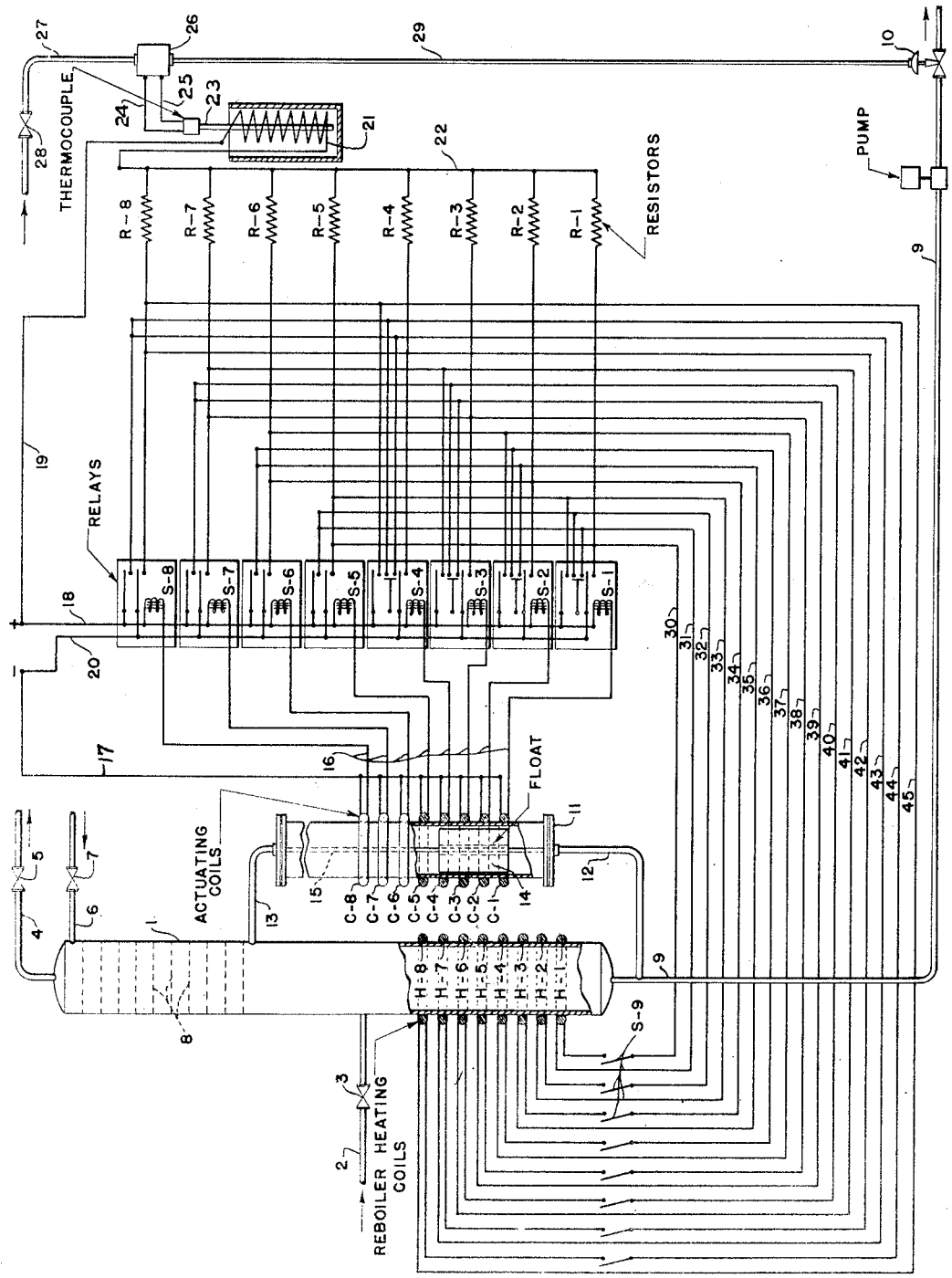

2,598,036

UNITED STATES PATENT OFFICE 2,598,036

COMBINED FRACTIONATION HEATING AND LIQUID LEVEL CONTROL MEANS

John Thomas Cahill, Hinsdale, and George W. Jandacek, Chicago, Ill., assignors to Universal Oil Products Company, Chicago, Ill., a corporation of Delaware Application January 23, 1951, Serial No. 207,338

3 Claims. (Cl. 202—206)

This invention relates to improved combined fractionation heating and liquid level control means operating responsive to a float controller. More specifically, the invention relates to automatic electrical control means which is operative responsive to the upward and downward movement of an enclosed float within a liquid containing tube connective with the fractionating or distillating column, whereby varying liquid levels effect the operation of accompanying electrical circuits to provide control of both the liquid level of the column and fractionation control through regulated heating in the reboiling section.

There are various types of float members which are housed within liquid containing chambers or vessels so that variations in level of the float actuate, either mechanically or electrically, automatically operating means for controlling level within the vessel. Such apparatus arrangements are of advantage in connection with vessels handling corrosive materials or which are under high superatmospheric pressure, in that they obviate the necessity of bearings, packing glands and the like through the walls of the liquid retaining vessel itself. However, many of the present forms of level control apparatus which utilize an enclosed floating member to intercept one or more fields of encompassing electrical coils, do not provide for a regulating type of electrical circuit and switching or relay control means which in turn provide for both closely controlled reboiler heating and electrical resistance regulation of a throttling types of flow control means. It may also be noted that in connection with various types of fractionating or distilling columns, such as used in the hydrocarbon conversion and processing arts, there are operating conditions wherein the charge stream not only varies in its rate of flow to a column, but varies also in composition, such that it is desirable to control the heating or fractionating conditions, as well as liquid level.

It is a principal object of the present invention to utilize automatic electrical control means including a float in a tubular liquid chamber which has a plurality of vertically spaced electrical coils exteriorly thereof, whereby the float member may intercept the electrical fields of each of the coils as the liquid level varies in the fractionating vessel to be controlled, and resulting changes in reactance from the coils utilized in combined electrical circuits to provide in a novel manner both the control of liquid level in the column and the control of fractionating conditions.

It is also an object of the present invention to provide an electrical circuit with a plurality of resistors receiving current responsive to the movement of a float member through encompassing actuating coils whereby there is effected a change in voltage from a thermocouple and the close control and regulation of adjustable flow control means in a conduit connecting with the processing chamber.

It is a still further object of the invention to provide a plurality of interconnected electrical resistance heaters which operate in both series and parallel arrangements so that there is a resulting close control and regulation of heating and fractionating conditions in the processing chamber responsive to a float member and a plurality of encompassing actuating coils, where the latter have their fields intercepted by the float member raising and lowering with a varying liquid level in the chamber.

In one embodiment, the present automatic electrical fractionation and level control apparatus comprises in combination, an elongated vertically positioned float chamber connecting with the lower portion of a fractionating column or other liquid receiving column in a manner providing a liquid level responsive to varying liquid levels in the fractionating column itself, an electrical power source, a plurality of vertically spaced electrically energized coils positioned around the external portion of the float chamber, a float member within the float chamber which is adapted to raise and lower with a varying liquid level therein and intercept the electrical fields of the vertically spaced electrical coils, each of the spaced electrical coils connecting with an electrical relay, and the latter connecting with a plurality of resistors and a plurality of reboiler heating coils, the reboiler heating coils being positioned in indirect heat exchange relationship with the lower liquid section of the fractionating column and operative to regulate the heating of the liquid therein responsive to changes in liquid level and the interception of the electrical fields of the coils around the float chamber by the float member, and each of the plurality of resistors connecting with a thermocouple heating coil having a thermocouple mounted adjacent thereto, the thermocouple connecting to and having resulting voltage changes operating an automatic control instrument, and the control instrument connecting with flow control means in a liquid conduit connecting with the lower liquid reservoir portion of the fractionating column, whereby to provide a liquid level control therefore.

The plurality of resistors which connect with the thermocouple heating coil may be connected with the plurality of relays and the electrical power source in a manner providing a series circuit or a parallel circuit, such that as each rely is operated responsive to the interception of the fields of the actuating coils around the float chamber, by the float member moving up and down therein, there is provided a wide range of controlled heating for the thermocouple heating coil. The heated thermocouple in turn provides a wide range of operation for the control instrument and the flow control valve in the liquid conduit from the fractionating chamber. The flow control instrument which operates responsive to the change in temperature from the thermocouple may be of an electrical or air operated type, while similarly the flow control valve may be of the electrical motor or air diaphragm type suitable to throttle the flow of liquid from the fractionating column responsive to changes in the control instrument.

The plurality of reboiler heating coils may connect in indirect heat exchange relationship with a reboiler which is connected to the fractionating column or alternatively, may connect directly with the lower portion of the fractionating column in a manner to heat the liquid within the lower reservoir portion of the chamber itself. It is, however, a feature of the present operating method and apparatus to connect the plurality of the reboiler heating coils with the plurality of relays in a manner such that a portion of the latter connect a portion of the reboiler heating coils in a parallel type of electrical circuit, as well as in series. Thus, as the float member intercepts the various actuating coils around the float chamber, the relays bring into operation the heating coils in a series circuit, and alternately a group or portion of the heating coils in a parallel circuit, to in turn provide increased resistance and rate of heat input into the liquid retained in the vessel.

The liquid level and fractionating control apparatus of this invention will be better understood upon reference to the accompanying drawing and the following description thereof, while still further advantages and variations may be noted in connection therewith.

Referring now to the drawing, there is indicated a vertical column 1, which for example, may be a fractionating or distilling column suitable to effect the controlled recovery of desired gasoline fractions from a naphtha or gas-oil stream being charged thereto by way of conduit 2 and control valve 3. It is of course not intended to limit the present improved level control and heat regulating means to use with a fractionating column accommodating a hydrocarbon stream, however, fractionating columns are one of the type which in general require close control and the present type of apparatus is particularly adapted for use therewith. Thus, it will be assumed in the following description that a hydrocarbon stream is being fractionated in column 1 and that desired gasoline fractions are being withdrawn from the top thereof by way of line 4 and control valve 5 and that a suitable reflux stream is being returned to the upper end of the column by way of line 6 and valve 7. The upper portion of the column has a plurality of vertically spaced decks or bubble trays 8 and the lower portion of the column is adapted to maintain a reservoir of liquid, with a bottoms stream being withdrawn by way of conduit 9 and control valve 10.

In accordance with the present invention, a liquid receiving float chamber 11 is connected with the fractionating vessel 1 by means of a lower line 12 and an upper line 13 so that a liquid level is maintained within the interior of the chamber 11 equivalent to that maintained within the lower portion of the chamber 1. Within the interior of the elongated chamber 11 is a float 14 which is maintained in position by a vertical guide bar 15. The float member 14 may be hollow but must be metallic and magnetically permeable. The float 14 is of course adapted to rise and fall within the vertical chamber 11 as the liquid level therein raises and lowers responsive to the liquid level changes in the lower portion of the chamber 1.

A plurality of electrical coils, designated as C-1 through C-8, encompass the float chamber 11 and are spaced vertically exteriorly thereof in a manner traversing the range of the liquid level variations within the lower portion of the column 1 and in the float chamber 11. Each of the electrical coils connect separately with electrical relays or switches, indicated as S-1 to S-8, by means of connecting wires 16. The electrical coils C-1 to C-8 are provided with electrical power by way of supply lines 17 and 18, the latter connecting through the plurality of switches S-1 to S-8 and lead lines 16 to the other end of the coils.

In the operation of the apparatus, as the liquid level in the vessel changes, either raising or lowering so that the float member 14 in turn travels upwardly or downwardly through the float chamber 11, the electrical fields of the coils C-1 to C-8 are intercepted by the float member itself and there is an impedance or voltage change from the coils which in turn actuate the relay switching means, indicated as S-1 to S-8, to in turn provide current flow to one or more heaters of a group of heaters indicated as H-1 to H-8 encompassing the lower portion of the fractionating column 1 and a plurality of resistors R-1 to R-8 which are connected in a manner to feed proportional currents to a heating coil 21. Each resistor connects separately with a relay, R-1 connecting with S-1, R-2 connecting with S-2, and so on, so that as each actuating electrical coil has a change in its electrical current flow due to the float member 14, the corresponding relay provides a current flow through one of the resistors. The resistors are connected in a parallel circuit by means of the line 22 connecting with heating coil 21 and the electrical power supply line 19 which connects to the other end of the heating coil 21 to complete the circuit. A thermocouple 23 is placed within or adjacent the heating coil 21 so that it generates more or less voltage responsive to the effect of resistors R-1 to R-8, which in turn are responsive to actuating coils C-1 to C-8. The electrical voltage output from the thermocouple 23 through lines 24 and 25, regulates a control instrument 26.

The present embodiment indicates an air pressure control type of instrument having an air pilot type of control means and air pressure supplied thereto through line 27 and valve 28. Thus the controller 26 regulates air pressure through line 29 to a diaphragm control valve 10 in the conduit 9. The control valve 10 of course operates so that as the liquid level in the fractionating column 1 increases it is gradually opened, due to the increase in the number of resistors R-1 through R-8 coming into the circuit and the increased heating of coil 21, permitting a greater quantity of the liquid to be pumped out of the bottom portion of the vessel.

In the present embodiment, the heating coils H-1 through H-8 are indicated as being directly around the lower portion of the fractionating column, however, these reboiler heating coils serve to control the vaporization of the liquid material in the lower portion of the column and may connect with a reboiler chamber which is separated from the lower portion of the fractionating column 1 but connected therewith by means of suitable piping or conduits. In accordance with the present invention, and as hereinbefore noted, when the float 14 rises within the chamber 11 and intercepts the various electrical coils C-1 to C-8, the switching or relay means S-1 to S-8 supply current, which flows not only individually to the resistor coils R-1 through R-8, but provides current which flows to the plurality of reboiler heating coils H-1 through H-8. The heating coils receive electrical power by way of supply lines 18 and 20 and through the plurality of relay means S-1 to S-8, which in turn connect with the coils by way of lines 30 through 45. It is also a feature of the present invention to effect the electrical connection of the heating coils H-1 through H-8 in both series and parallel arrangements in order to provide a better and closer control of heat to the reboiler section of the fractionating column. For example, in the present specific embodiment of the drawing, as the float 14 rises in column 11 and intercepts the field of coil C-1, relay S-1 is actuated to pass current by way of lines 30, 31, 32, and 33 to the lower reboiler heating coils H-1, and H-2 in a series arrangement. A change in current flow from coil C-2 actuates relay S-2 and provides electrical current by way of lines 34, 35, 36, and 27 to the heating coils H-3, and H-4 in series. Coil C-3 actuates relay or switch S-3 and the latter in turn connects with the relay means S-3 so that heater coils H-5 and H-6 are connected in series by way of lines 38, 39, 40 and 41. Similarly C-4 and S-4 energize and connect coils H-7 and H-8, by way of lines 42, 43, 44 and 45. However, as the float 14 intercepts coil C-5, the coil C-1 is no longer under the influence of the float and S-1 no longer operates H-1 and H-2 in series, but S-5 by means of suitable interconnecting wiring connects heater coils H-1 and H-2 together in a parallel manner. In a similar manner, coils C-6, C-7, and C-8 operate relays S-6, S-7, and S-8 respectively causing heaters H-3 and H-4, H-5 and H-6, and H-7 and H-8, respectively, to operate in parallel. Thus, as the liquid level rises such that float 14 is intercepting coil C-5, and higher the heating coils switch from series connection to a parallel arrangement with increased resistance and heating, as well as a close control of heating.

It is of course not intended to limit the present invention, relating to a combined level control and fractionation control system, to the use of any one type of relay or switching means, and it may also be noted that an electronic "firing" tube or "trigger" tube may be used in an electronic circuit, where small changes in current from actuating coils effect the firing of the tubes themselves, to in turn control the resistors and the reboiler heating coils. It should also be noted that in preferred embodiments of the control system, that the relays or switching means are operative to cut out the current flow to the various resistors R-1 to R-8 and to the reboiler heating coils H-1 to H-8, as the float falls within the float control chamber 11 as well as successively cutting them in to operation when the float rises in the chamber as hereinbefore described. Manually controlled switches S-9 in lines 30 to 44, are desirable for safety purposes, or to provide means for cutting out any one of the reboiler heater coils.

The present embodiment has the regulated thermocouple 23 operating a controller 26 which is of the air operated type in turn regulating a diaphragm type of control valve 10, however, here again it may be noted that a controller may be utilized which operates an electrical motor or solenoid type of valve in place of the diaphragm type of valve 10.

We claim as our invention:

1. Automatic fractionation and level control apparatus for use with a fractionating column, which comprises in combination, an elongated vertically positioned float chamber connecting with the lower liquid reservoir portion of said fractionating column and providing a liquid level therein varying with that in said column, an electrical power source, a plurality of vertically spaced electrically energized coils around said float chamber, a float member within said float chamber suitable to raise and lower with a varying liquid level and intercept the electrical fields of said plurality of spaced coils, each of the latter connecting with separate electrical relay means, with each relay of the plurality thereof connecting with an electrical resistor and with at least one of a plurality of reboiler heating coils, said reboiler heating coils positioned in indirect heat exchange with the liquid reservoir section of said fractionating column and regulating heating of the liquid therein responsive to changes in liquid level and the interception of the electrical fields of said coils around said float chamber, and each of said resistors connect successively with a thermocouple heating coil having a thermocouple positioned adjacent thereto, said thermocouple connecting with and operating an automatic control instrument, and the latter connecting with and operating a flow control means in a liquid conduit connecting with the lower liquid portion of said fractionating column.

2. The apparatus of claim 1 further characterized in that wiring connects between said relays and said reboiler heating coils in a manner providing that a portion of said relays connect at least a portion of said reboiler heating coils in parallel, whereby to provide a close regulation of heat to the plurality of reboiler coils and the liquid reservoir section of said fractionating column.

3. Automatic fractionation and level control apparatus for use with a fractionating column, which comprises, an elongated vertically positioned float chamber connecting with the lower liquid reservoir section of said fractionating column and providing a liquid level therein varying with that in said column, an electrical power source, a plurality of vertically spaced electrically energized coils positioned around said float chamber and connecting with said power source, a magnetic float member within said float chamber which is guided therein and suitable to move upwardly and downwardly with a varying liquid level and intercept the electrical fields of said plurality of spaced coils, each of the plurality of electrical coils connecting separately with one of a plurality of electrical relay means, and each of the electrical relay means connecting with an electrical resistor of a plurality thereof and at least one reboiler heating coil of a plurality thereof positioned in indirect heat exchange with the liquid reservoir section of said fractionating column, each electrical resistor connecting with a thermocouple heating coil in a parallel circuit, whereby said float member rising within said float chamber and intercepting the electrical fields of said spaced coils operates said relay means to successively connect additional resistors with said thermocouple heating coil and conversely said relay means successively disconnects resistors as said float member falls within said float chamber and descends through said vertically spaced coils, said electrical relay means connect with said plurality of reboiler heating coils in a manner connecting said coils in both series groups and in parallel groups whereby to closely regulate the heating of said reboiler section of said fractionating column responsive to the movement of said float member, an electrical thermocouple positioned adjacent said thermocouple heating coil, and said thermocouple connecting with an automatic control instrument, with the latter connecting with and operating a flow control valve in a liquid conduit connecting with the lower liquid reservoir portion of said fractionating column.

JOHN THOMAS CAHILL.
GEORGE W. JANDACEK.

REFERENCES CITED

The following references are of record in the file of this patent:

UNITED STATES PATENTS

| Number | Name | Date |
|---|---|---|
| 2,240,952 | Hetzer | May 6, 1941 |
| 2,350,006 | Wolfner | May 30, 1944 |
| 2,533,945 | Legatski | Dec. 12, 1950 |